United States Patent Office 3,133,048
Patented May 12, 1964

3,133,048
WATER-INSOLUBLE RESINS OF 4(AR-VINYL-BENZYL)-3-MORPHOLINONE
Carl Moore and William F. Tousignant, Midland, Mich., assignors to The Dow Chemical Company, Midland, Mich., a corporation of Delaware
No Drawing. Filed Mar. 5, 1962, Ser. No. 177,243
5 Claims. (Cl. 260—88.3)

This invention concerns water-insoluble, polymeric, 4-(ar-vinylbenzyl)-3-morpholinone resins and their method of preparation.

The present invention makes possible the utilization of the complexing properties of 3-morpholinone groups without the disadvantages of having a water-soluble 3-morpholinone reactant.

Until the present time, it was not known how to make a homogeneous, water-insoluble, resinous polymer which would afford both the advantages of its 3-morpholinone groups for forming complexes with aqueous-phase reactants and the advantages of water insolubility, so that a separation could be had from an aqueous medium of a complexed, water-insoluble, resinous, polymeric 3-morpholinone.

It has now been discovered that homogeneous, water-insoluble, polymeric 3-morpholinones can be prepared by reacting an alkali metal salt of a 3-morpholinone having the formula

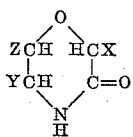

wherein X, Y and Z individually are selected from the group consisting of hydrogen and 1 to 4 carbon alkyl groups, with a chloromethylated vinylaryl polymer having 0.75 to 1.5 chloromethyl groups per available aryl nucleus, crosslinked with between 0.9 and 5 mole percent, vinylaryl polymer basis, of a crosslinking agent having two vinylidene groups, in stoichiometric or substantially stoichiometric proportions.

The reaction schematically is as follows:

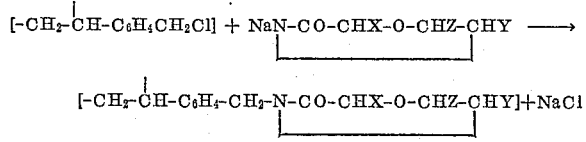

wherein the first reactant represents polymeric vinylbenzyl chloride and the second reactant represents the sodium salt of 3-morpholinone or of its alkyl substituted derivatives, as specified supra.

The chloromethylated resinous polymers utilized in the process of this invention are those of styrene, o-, m- and p-methylstyrene, o-, m- and p-ethylstyrene, vinylnaphthalene, vinylanthracene, their mixtures and homologs, containing between 0.75 and 1.5 chloromethyl groups per aromatic nucleus and crosslinked with between about 0.9 and 5 mole percent, vinylaryl polymer basis, of a crosslinking agent having two vinylidene groups, e.g., divinylbenzene, divinyltoluene, divinylxylene, divinylethylbenzene, divinylnaphthalene, vinyl acrylate, diacrylate esters, dimethacrylate esters, diallyl esters, methylenebisacrylamide, etc.

Advantageously, these chloromethylated crosslinked copolymers are prepared in two stages. First, a conventional oil-in-water suspension polymerization process, as used in making ion exchange resins having a polymeric styrene matrix, is used wherein resinous vinylaryl polymers, crosslinked as specified, are obtained as discrete beads or spheroids. These latter are then chloromethylated in usual ways, e.g., with a mixture of formaldehyde and hydrochloric acid or a mixture of a dihalide and a Friedel-Crafts catalyst, as described in Organic Reactions, vol. I, page 63 et seq., John Wiley & Sons, Inc., 1942. Alternatively, the chloromethylvinylaryl monomers corresponding to the polymers previously listed, e.g., o-chloromethylstyrene, p-chloromethylstyrene, mixtures thereof, etc., together with crosslinking agent, can be polymerized in mass or in organic solution to give products similar to the preceding polymers.

The chloromethylated, crosslinked, vinylaryl polymers are reacted with a stoichiometric or substantially stoichiometric proportion and up to 10 percent excess of an alkali metal salt of a 3-morpholinone, as specified, advantageously formed in situ from the corresponding 3-morpholinone and free alkali metal or alkali metal alkoxides, advantageously of a 1 to 4 carbon monohydric alcohol. The reaction is advantageously carried out in the presence of an organic swelling agent for the chloromethylated, resinous, vinylaryl polymers, i.e., a swelling agent which swells resinous chloromethylstyrene polymers and does not react with alkali metal or alkali metal alkoxides under reaction conditions, in amount sufficient to provide a fluid, stirrable slurry. Such swelling agents are chloroform, tetrachloroethane, o-dichlorobenzene, cis-dichloroethylene, trichloroethylene, tetralin, pentachloroethane, methylchloroform, dioxane, tetrahydrofuran, dimethylformamide, perchloroethylene, carbon tetrachloride, ethylidenedichloride, chlorobenzene, toluene, ethylbenzene, benzene, xylene and cyclohexane. The 3-morpholinone compound itself, in excess, can also be used as a swelling agent at temperatures above its melting point.

The reaction between the polymeric chloromethylvinylaryl resin and the alkali metal 3-morpholinone salt is carried out at a temperature between about 50° and 150° C. for a time sufficient to displace at least 40 percent and up to substantially all of the benzylic chloride, which displacement can be followed by periodic analyses. The reaction is carried out at atmospheric, subatmospheric or superatmospheric pressure. Generally atmospheric or substantially atmospheric pressure is most advantageous.

The following examples describe completely representative specific embodiments and the best mode contemplated by the inventors of carrying out their invention in polymeric 4-(ar-vinylbenzyl)-3-morpholinone resins.

*Example 1*

A quantity of 350 ml. of dry dioxane and 27.8 g. (0.275 mole) of 3-morpholinone was charged to a 1-liter, 3-neck resin flask provided with a condenser, stirrer and thermoregulator. Stirring was started and the temperature was raised to 100° C. A quantity of 5.8 g. (0.275 mole) of sodium metal was dissolved in the hot liquid by slow addition. A quantity of 38.14 g., dry basis (0.25 mole), of dioxane-wetted, chloromethylated, resinous, polymeric styrene beads, crosslinked with one mole percent of divinylbenzene, was then added to the stirred mixture with the aid of a small volume of dioxane. The reaction mixture was continually stirred, lowered to 80° C. and held at 80° C. for 18 hours. The flask contents were cooled to room temperature, and the product beads were suction filtered, washed well with methanol, then with water and suction filtered again. The wet product beads were tan in color, weighed 86 g. and had a water content of 42.2 percent. The dry product yield was 49.7 g. Analysis of the product showed a nitrogen content of 4.12 percent and a chlorine content of 1.43 percent, which is equivalent to a conversion of 93 percent, based on reactant chloromethylated resin beads.

The procedure described above when repeated with substituted 3-morpholinones having 1 to 3 methyl, ethyl, propyl or butyl groups in the 2, 5 and 6 positions on the morpholinone ring gives similar products.

*Example 2*

A ½-liter resin flask was used with similar fittings as above. The dioxane, 350 ml., and 27.8 g. of 3-morpholinone were charged into the flask along with 15.65 g. of NaOCH$_3$ and 47.37 g. of one percent divinylbenzene crosslinked, chloromethylated resin beads (38.14 g. on a dry basis). The temperature was raised to 80° C. and held there for 18 hours while the contents were stirred. As before, the product was filtered, then methanol and water washed, and again filtered. Analysis showed 70.8 g. of wet product having a moisture content of 43.3 percent, 40.1 g. on a dry basis. The nitrogen content was 2.31 percent and chlorine content 5.83 percent. Conversion was approximately 40 percent based on nitrogen content of the final resin.

The resins of this invention can be used for complexing a variety of compounds from a gas phase or from aqueous solution. For example, the product of Example 1 had an equilibrium capacity of 0.207 g. phenol per gram of dry resin when equilibrated with aqueous phenol.

Complexes of the resins of this invention with various compounds are decomposed, and the resins are thereby regenerated, by elution with one of the following aqueous reagents, depending upon the complexed compound: (*a*) dilute, ca. 4%, sodium hydroxide; (*b*) dilute, ca. 4%, acetic acid; (*c*) dilute, ca. 5%, ammonium hydroxide; (*d*) dilute, ca. 2.5%, sodium hypochlorite. For example, complexes of the resins of this invention with phenol are eluted with aqueous dilute sodium hydroxide to remove and recover phenol as sodium phenate and to regenerate the resins of this invention.

What is claimed is:

1. A resinous, polymeric 4-(ar-vinylbenzyl)-3-morpholinone crosslinked with ca. 0.9 to 5 mole percent of a crosslinking agent having two vinylidene groups, the 3-morpholinone moiety having the formula

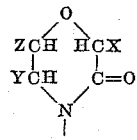

wherein X, Y and Z individually are selected from the group consisting of hydrogen and 1 to 4 carbon alkyl groups.

2. The product of claim 1 wherein the crosslinking agent is divinylbenzene.

3. Method for making a water-insoluble, resinous, polymeric 4-(ar-vinylbenzyl)-3-morpholinone by reacting substantially stoichiometric proportions of an alkali metal salt of a 3-morpholinone having the formula

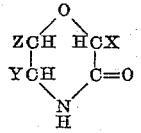

wherein X, Y and Z individually are selected from the group consisting of hydrogen and 1 to 4 carbon alkyl groups, with a resinous ar-chloromethyl-substituted vinylaryl polymer having from about 0.75 to 1.5 chloromethyl groups per aryl nucleus and being crosslinked with between 0.9 and 5 mole percent, vinylaryl polymer basis, of a crosslinking agent having two vinylidene groups, at a temperature between about 50° and 150° C. for a time sufficient to displace at least 40 mole percent of benzylic chloride with 3-morpholinone moieties.

4. The method of claim 3 wherein the ar-chloromethyl-substituted vinylaryl polymer is that of styrene.

5. The method of claim 3 wherein the alkali metal salt is that of 3-morpholinone.

References Cited in the file of this patent
UNITED STATES PATENTS 2,600,024     Romeyn et al. _____ May 4, 1950
2,987,509     Burgert _____ June 6, 1961

OTHER REFERENCES

Hale, "Chelating Resins," Research 9, 104–108 (1956).